Patented July 27, 1926.

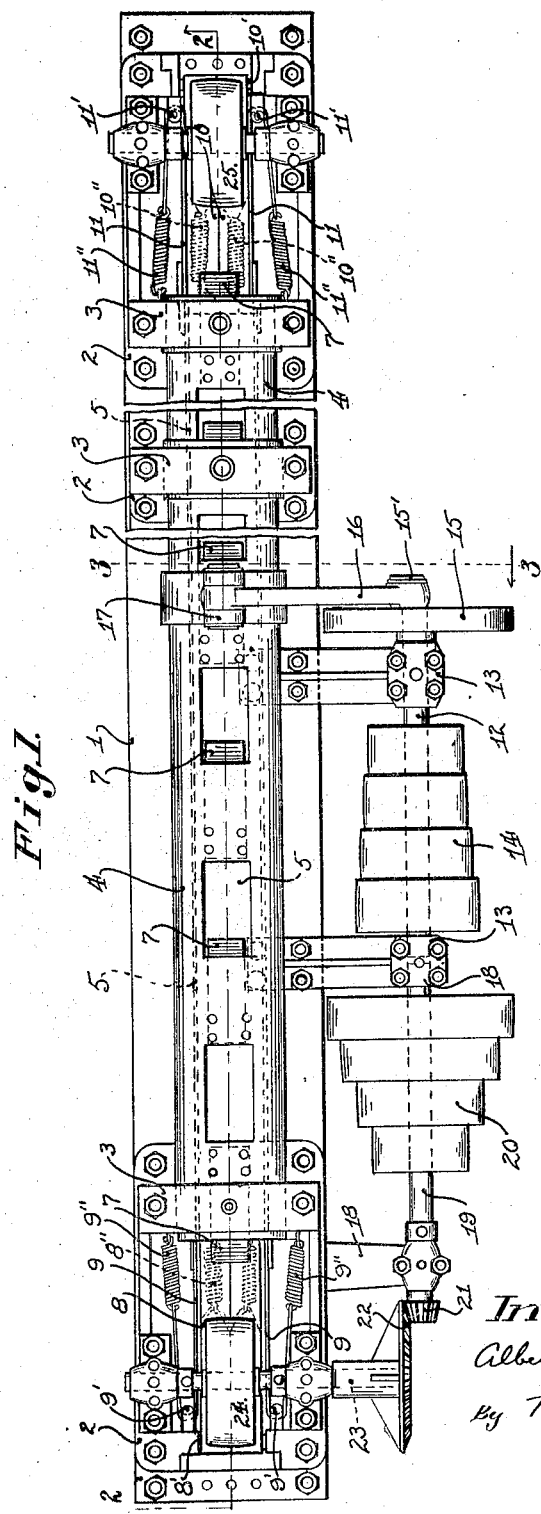

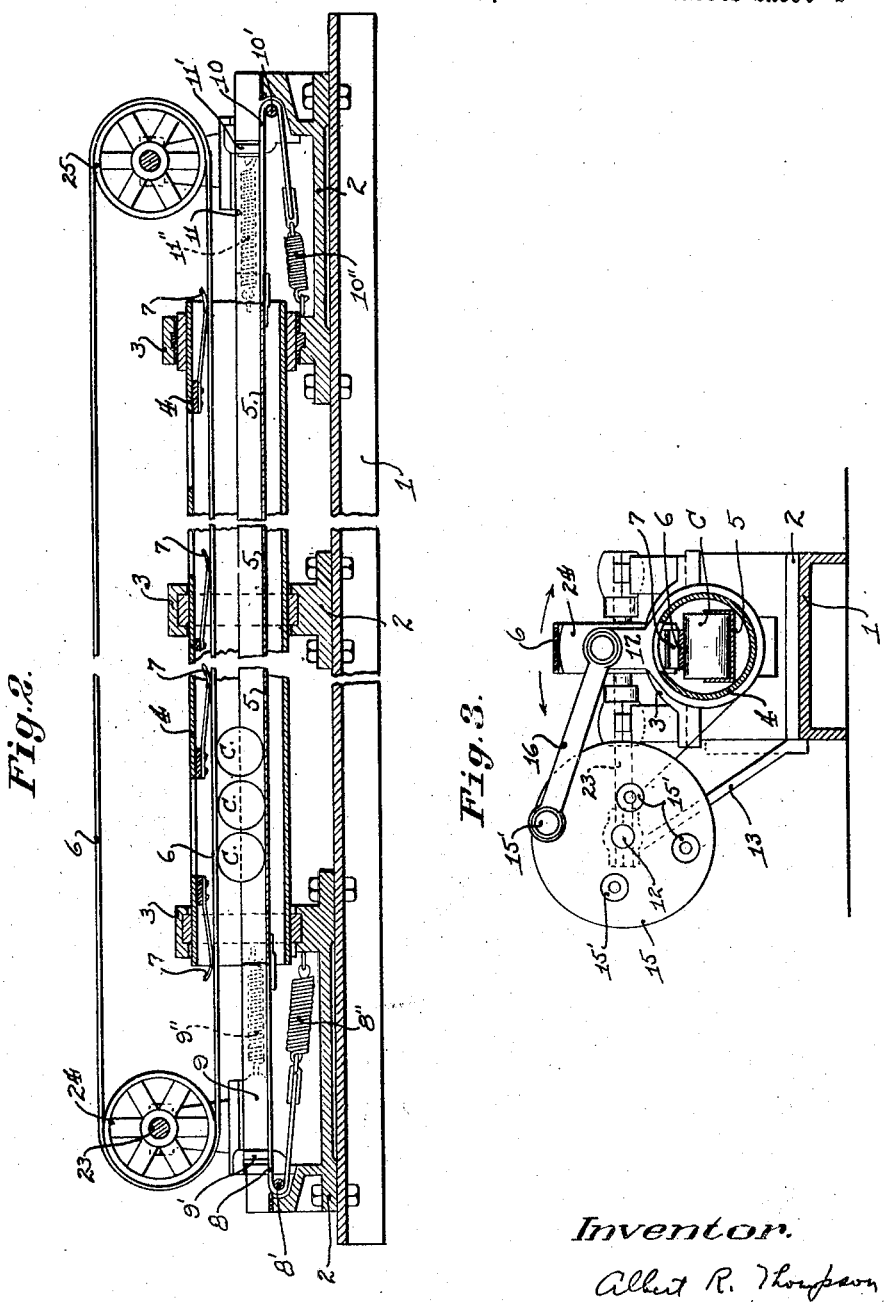

1,594,227

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

CANNED-GOODS SHAKER.

Application filed February 3, 1926. Serial No. 85,810.

My invention relates to the processing and packaging of comestibles and other goods, generally defined as the canning art and in terms of which, for the sake of simplicity, I shall herein refer to my improvement, though it must be understood that in using such terms as canning and cans I mean to include any packaged goods whether confined in cans, bottles or other containers.

There are certain goods, which, due to their nature, or to the details of their processing, or to other causes, require or are improved by a relatively vigorous shaking after final cooking in their hermetically sealed cans. One example is corn, which by final shaking is rendered more creamy. Another example, which is the one I have particularly in mind, is milk. In the processing steps of canning milk, including the preheating, the sterilizing and the cooling of the sealed cans, there is a tendency to form curds, and it is common practice to dissipate such curds by shaking the cans vigorously.

It is, however, usual to subject the cans to such shaking, in batches confined in trays or boxes, as such a proceeding naturally follows the common practice of batch processing. This form of shaking is open to several objections, notably the loss of time involved in putting a batch in the tray or box and removing it therefrom.

In the canning art modern practice seeks speed, and this is best attained by providing for a continuous procession of cans through whatever zone or effect the treatment requires, in contradistinction, to the "batch" method which of necessity involves intermittency. Consequently, even in the processing of milk such continuous procession method is being applied.

This is true even to the extent of means for shaking the cans while in continuous and forwardly rolling procession. As far as I am aware, however, such means involve swinging the cans endwise through an arcuate path, due to a pendulous movement.

My invention contemplates an endwise oscillation of the cans about their own transverse or diametrical axes, such movement having several desirable advantages as will hereinafter appear.

One object of my invention therefore is to provide for shaking the cans by oscillating them about their transverse axes, and to do this while the cans are advancingly rolling. This and other objects will fully appear in the course of the following description of a preferred form of an apparatus adapted for their attainment.

In the accompanying drawings—

Fig. 1 is a plan view, broken, of my canned-goods shaker.

Fig. 2 is a section on the line 2—2 of Fig. 1.

Fig. 3 is a section on the line 3—3 of Fig. 1.

1 is a supporting member of the machine, here shown as of channel section. To this channel are bolted the several bed-plates 2 upon which, through rings 3, is mounted for oscillation about its axis a housing member in the form of a pipe 4.

Within this housing pipe is fixed a can-path member 5 in the shape of a channel, said member being of cross sectional area adapted to receive cans, indicated by C, in such wise that they may roll in and through the can-path. The cans project above the sides of the member, and upon said projecting can-circumference, the lower run of a traveling belt 6 bears, the contact being insured by means of the hold down springs 7 secured within the housing pipe 4, access to said springs being had through openings 4' in the pipe.

It will now be seen that a procession of cans C entering the pipe 4 at one end, will be rolled along the can path member 5 by the belt 6, from one end of the path to the other, and by an oscillation of the pipe on its axis, the cans will be rocked about their transverse axes.

I deem this endwise oscillatory shake of the cans about their transverse axes more advantageous than an arcuate endwise reciprocation, or than a circumferential oscillation, in that it effects a more thorough agitation of the contents, with the exercise of less force in overcoming inertia and less wear and tear on the can-path member; and furthermore, such endwise oscillation when imparted, as herein shown, simultaneously with the rolling advance of the cans, subjects the can contents to as full, thorough and equable agitation as is possible.

As I have heretofore stated, my invention contemplates the application of a shaking movement to a continuous traveling procession of cans. This procession must necessarily initially approach the zone or region of shake in a normal condition of what may be termed "non-shake" and, thus, a problem is presented of a means for passing the procession without the possibility of interference or interruption across the line of demarcation between the end of the non-shake approach and the beginning of the shake region, especially as it will be seen that the oscillation of the pipe and its can-path member is continuous.

To satisfy this condition, I provide a torsionally flexible entrance can-path member as follows.

8 designates a pair of belts, which lie side by side to form the bottom of said entrance member, and 9 designates a pair of belts which form the sides of said member. One end of the belts 8 is fastened to the bottom of the can path member 5 within the housing pipe 4; said belts thence extend to and around a guide rod 8' in one of the bed-plates 2 and thence to tightener springs 8" secured to said bed-plate.

Similarly one end of the belts 9 are secured to each side respectively of the can-path member 5, and said belts thence extend to and around a guide at 9' and thence to tightener springs 9". These belts 8 and 9 thus form a channel entrance path aligned with the can path 5, said entrance path having at its beginning and for a portion of its length no twisting stress, and for the remainder of its length having a gradually increasing torque up to the can path 5 where its side oscillation coincides with that of said path.

Obviously a similar condition is present at the discharge end of the can-path member 5; and to meet this I have a torsionally flexible delivery can-path member comprising the belts 10 and 11, with their guides, 10' and 11' and tightener springs 10" and 11", all similar but reversed in directional effect to the components of the entrance member.

A brief description of the operation of the shaker will now present the matter clearly.

Assume that an oscillatory vibration is imparted to the housing pipe 4 about its axis, and that a traveling movement forwardly is given the fold of the belt 6 which passes through the pipe. A continuous procession of cans is delivered to the forward end of the entrance member composed of belts 8 and 9 which end being practically at rest is adapted to receive said procession without any interference or interruption whatever. The procession, advancing through said entrance member with rolling action due to the overlying belt 6 is gradually and increasingly oscillated endwise of the rolling cans and enters the can path 5 smoothly with no possibility of jamming. Rolling through the can path 5, under the contact of the belt 6, the cans are oscillated endwise about their transverse axes, and as the procession reaches the delivery end of the path 5 it enters upon the discharge member composed of belts 10 and 11, and its oscillation is therein reduced and finally dissipated at the point of delivery to its destination. Further describing the machine with respect to its power transmissions, 12 is a shaft mounted in brackets 13 and carrying a series of cone pulleys 14 for varying the speed. Upon one end of the shaft is a crank disk 15 having a plurality of crank rod connections 15' for varying the stroke. 16 is a crank rod extending to a crank arm 17 secured to the housing pipe 4. Thus the necessary oscillation is imparted to said pipe 4 and its stroke may be varied as desired.

Mounted in other brackets 18 is a shaft 19 having a series of speed adjusting cone pulleys 20. One end of the shaft 19 carries a pinion 21 which meshes with a gear 22 on a cross shaft 23, the latter carrying the head pulley 24 of the belt 6, the foot pulley of said belt being shown at 25. The belt 6 is thus driven and its speed varied as desired.

I claim:—

1. A canned-goods shaker comprising a can-path member adapted for the passage of a can; and means for oscillating said member about an axis passing longitudinally therethrough.

2. A canned-goods shaker comprising a can-path member adapted for the passage of a can; and means for oscillating said member about an axis passing longitudinally therethrough and diametrically through the can therein, whereby said can is rocked endwise.

3. A canned-goods shaker comprising a can-path member adapted for the rolling passage of a can; and means for oscillating said member about a longitudinal axis passing diametrically through the can, whereby said can is rocked endwise.

4. A canned-goods shaker comprising a can-path member; means for rolling a can through the path of said member; and means for oscillating said member during the rolling passage of the can about an axis passing transversely therethrough.

5. A canned-goods shaker comprising a can-path member adapted for the passage of a can; means for oscillating said member about its longitudinal axis; and a torsionally flexible member having one of its ends connected and communicating with the can-path member and connected at the other end with a fixed point.

6. A canned-goods shaker comprising a can-path member adapted for the passage of a can; means for oscillating said member about its longitudinal axis; and a torsionally flexible member consisting of belts relatively disposed to form can-paths, said belts at one end being connected with the can-path member, and connected at the other end with a fixed point.

7. A canned-goods shaker comprising a can-path member adapted for the passage of a can; means for oscillating said member about its longitudinal axis; torsionally flexible can-entrance and can-discharge members consisting of belts relatively disposed to form can-paths, said belts being connected at one end with the entrance and discharge ends respectively of the can-path member, and connected at the other end with a fixed point; and a traveling belt overlying said can-path member and said entrance and discharge members and disposed for contact with the can to hold it in and advance it through said members.

8. A canned-goods shaker comprising a housing; a can-path member longitudinally fixed within said housing and adapted for the passage of a can; a traveling belt moving through said housing above the can-path member and in contact with the can to hold it in and advance it through the can path member; and means for oscillating said housing about its longitudinal axis.

9. A canned-goods shaker comprising a housing; a can-path member longitudinally fixed within said housing and adapted for the passage of a can; means for oscillating said housing about its longitudinal axis; torsionally flexible can-entrance and can-discharge members connected and communicating at one end with the entrance and discharge ends respectively of the can-path member and connected at the other end with a fixed point; and a traveling belt moving through said housing and in contact with the can to hold it in and advance it through the can-path member and the entrance and discharge members.

10. A canned-goods shaker comprising a housing; a can-path member longitudinally fixed within said housing and adapted for the passage of a can; means for oscillating said housing about its longitudinal axis; torsionally flexible can-entrance and can-discharge members consisting of belts relatively disposed to form can-paths, said belts being connected at one end with the entrance and discharge ends respectively of the can-path member and connected at the other end with a fixed point; and a traveling belt moving through said housing and in contact with the can to hold it in and advance it through the can-path member and the entrance and discharge members.

In testimony whereof I have signed my name to this specification.

ALBERT R. THOMPSON.